United States Patent
Xu (10) Patent No.: US 11,657,204 B2
(45) Date of Patent: May 23, 2023

(54) METHOD OF WAFER LAYOUT AND EXPOSURE SYSTEM OF LITHOGRAPHY MACHINE

(71) Applicant: CHANGXIN MEMORY TECHNOLOGIES, INC., Anhui (CN)

(72) Inventor: Wei Xu, Hefei (CN)

(73) Assignee: CHANGXIN MEMORY TECHNOLOGIES, INC., Hefei (CN)

( * ) Notice: Subject to any disclaimer, the term of this patent is extended or adjusted under 35 U.S.C. 154(b) by 69 days.

(21) Appl. No.: 17/395,637

(22) Filed: Aug. 6, 2021

(65) Prior Publication Data

US 2021/0374316 A1    Dec. 2, 2021

Related U.S. Application Data

(63) Continuation of application No. PCT/CN2021/092903, filed on May 10, 2021.

(30) Foreign Application Priority Data

Jun. 1, 2020   (CN) .......................... 202010486727.0

(51) Int. Cl.
*G06F 30/30* (2020.01)
*G03F 7/20* (2006.01)
(Continued)

(52) U.S. Cl.
CPC ........ *G06F 30/392* (2020.01); *G03F 7/70433* (2013.01); *G06F 30/398* (2020.01); *G06F 2119/22* (2020.01); *H01L 27/0207* (2013.01)

(58) Field of Classification Search
None
See application file for complete search history.

(56) References Cited

U.S. PATENT DOCUMENTS 6,604,233 B1 *  8/2003  Vickery .............. G03F 7/70433
                                                          716/54
6,711,522 B2    3/2004  Shirai
(Continued)

FOREIGN PATENT DOCUMENTS

CN           1347519 A       5/2002
CN         101311737 A      11/2008
(Continued)

OTHER PUBLICATIONS

G. D. Croft et al., "Die-counting algorithm for yield modeling and die-per-wafer optimization," Proc. SPIE 3216, Microelectronic Manufacturing Yield, Reliability, and Failure Analysis III, 1997, pp. 186-196. (Year: 1997).*

(Continued)

*Primary Examiner* — Leigh M Garbowski
(74) *Attorney, Agent, or Firm* — Cooper Legal Group, LLC (57) ABSTRACT

Embodiments of the present application relate to the technical field of semiconductor, and disclose a design method of a wafer layout and an exposure system of a lithography machine. The design method of a wafer layout includes: providing a yield distribution map of a wafer under an initial wafer layout; determining a yield edge position of the wafer according to the yield distribution map; and calculating a new wafer layout according to a die size and the yield edge position.

19 Claims, 4 Drawing Sheets

(51) Int. Cl.
  *H01L 27/02* (2006.01)
  *G06F 30/392* (2020.01)
  *G06F 30/398* (2020.01)
  *G06F 119/22* (2020.01)

(56) References Cited

U.S. PATENT DOCUMENTS

| | | | | |
|---|---|---|---|---|
| 6,980,917 | B2 * | 12/2005 | Ward | G03F 7/70433 702/120 |
| 7,243,325 | B2 * | 7/2007 | McIntyre | G06F 30/392 716/55 |
| 7,842,521 | B2 * | 11/2010 | Limb | H01L 31/0682 438/692 |
| 7,882,481 | B2 * | 2/2011 | Hempel | G03F 7/70433 700/121 |
| 8,129,217 | B2 * | 3/2012 | Schneider | H01L 51/0018 430/312 |
| 8,148,239 | B2 * | 4/2012 | Varela | G03F 7/70433 438/464 |
| 8,965,550 | B2 | 2/2015 | Hou | |
| 11,163,238 | B2 * | 11/2021 | Tee | G06F 30/327 |
| 2002/0170022 | A1 | 11/2002 | Shirai | |
| 2004/0128630 | A1 | 7/2004 | Ward | |
| 2013/0110272 | A1 | 5/2013 | Hou | |

FOREIGN PATENT DOCUMENTS

| | | |
|---|---|---|
| CN | 103187329 A | 7/2013 |
| CN | 102656668 B | 2/2015 |
| JP | 2008251811 A | 10/2008 |
| TW | 466657 B | 12/2001 |

OTHER PUBLICATIONS

International Search Report in the international application No. PCT/CN2021/092903, dated Jul. 28, 2021, 2 pgs.
First Office Action of the Chinese application No. 202010486727.0, dated Mar. 30, 2022, 22 pgs.

* cited by examiner

METHOD OF WAFER LAYOUT AND EXPOSURE SYSTEM OF LITHOGRAPHY MACHINE

CROSS-REFERENCE TO RELATED APPLICATIONS

The present application is a continuation of International application PCT/CN2021/092903, filed on May 10, 2021, which claims priority to Chinese patent application No. 202010486727.0, filed on Jun. 1, 2020, and entitled "Design Method of Wafer Layout and Exposure System of Lithography Machine". The contents of International application PCT/CN2021/092903 and Chinese patent application No. 202010486727.0 are hereby incorporated by reference in their entireties.

TECHNICAL FIELD

Embodiments of the present application relate to the technical field of semiconductor, and in particular to a design method of a wafer layout and an exposure system of a lithography machine.

BACKGROUND

Semiconductor wafers (such as wafers made of silicon, germanium, and III-V materials) are used in the manufacture of integrated circuits. Various semiconductor processes, such as lithography (e.g. patterning, etching, and deposition), epitaxial growth, doping, polishing, and other such processes, may be used on wafers to form dies. Several identical dies are usually formed on a single wafer, ranging from tens of dies per wafer to hundreds of dies per wafer or even thousands of dies per wafer, depending on the size of a device die.

In the related art, a wafer layout may be calculated according to a die size, an arrangement mode of dies in a single shot, and a wafer edge cleaning position, so that a maximum number of complete dies are obtained within the wafer edge cleaning position.

However, the inventors have found that since the yield of dies in the radial distribution of wafers is not all 100% in actual production, the number of qualified dies on a single wafer during the production of a wafer layout in the related art is often smaller than the number of calculated complete dies, so that the yield of the single wafer is low.

SUMMARY

Some embodiments of the present application aim at providing a design method of a wafer layout and an exposure system of a lithography machine.

The embodiments of the present application provide a design method of a wafer layout, which may include: providing a yield distribution map of a wafer under an initial wafer layout; determining a yield edge position of the wafer according to the yield distribution map; and calculating a new wafer layout according to a die size and the yield edge position.

The embodiments of the present application also provide an exposure system of a lithography machine, which may include: at least one processor; and a memory and an exposure device communicatively connected to the at least one processor. The memory may store instructions executable by the at least one processor, and the instructions may be executed by the at least one processor to enable the at least one processor to execute the above design method of a wafer layout to obtain a new wafer layout. The processor may be configured to send the obtained new wafer layout to the exposure device, and the exposure device may be configured to expose a wafer according to the new wafer layout.

When the yield distribution map of the wafer is changed under the new wafer layout, a new yield edge position is redetermined, and a corrected new wafer layout is recalculated according to the new yield edge position.

BRIEF DESCRIPTION OF THE DRAWINGS

One or more embodiments are illustrated by way of example in the figures of the accompanying drawings, which are not to be construed as limiting the embodiments, and in which elements having the same reference numerals represent similar elements and in which the figures are not to scale unless otherwise indicated.

DETAILED DESCRIPTION

To more clarify the objects, technical solutions, and advantages of the embodiments of the present application, various embodiments of the present application will be described below in combination with the accompanying drawings. However, those of ordinary skill in the art will appreciate that in various embodiments of the present application, numerous technical details are set forth in order to provide readers with a better understanding of the present application. However, even without these technical details and various changes and modifications based on the following embodiments, the claimed technical solution of the present application may be implemented.

A first embodiment of the present application relates to a design method of a wafer layout. The core of the present embodiment is as follows. A yield distribution map of a wafer under an initial wafer layout is provided. A yield edge position of the wafer is determined according to the yield distribution map. A new wafer layout is calculated according to a die size and the yield edge position. An initial wafer layout (i.e. a wafer layout in the related art) is determined according to a die size and a wafer edge cleaning position, but the yield of dies close to the wafer edge cleaning position is low or even zero due to the difference of a process control capability in the production process. Therefore, after a wafer is exposed according to the initial wafer layout in the related art, the number of obtained qualified dies is often smaller than the number of complete dies in the initial wafer layout. In the present embodiment, an actual yield edge position of the wafer is determined according to the yield distribution map of the wafer under the initial wafer layout, a damage condition of the dies close to the wafer edge cleaning position in the production process is considered when a new wafer layout is determined, the new wafer layout is determined according to the actual yield edge position and the die size, and the number of obtained qualified dies is approximately the same as the number of complete dies in the new wafer layout after the wafer is exposed according to the new wafer layout, thereby improving the production yield of qualified dies on the wafer.

The implementation details of the design method of a wafer layout of the present embodiment are described in detail below, and the following description is provided only to facilitate an understanding of the implementation details provided and is not necessary to implement the present solution.

Figure 1:
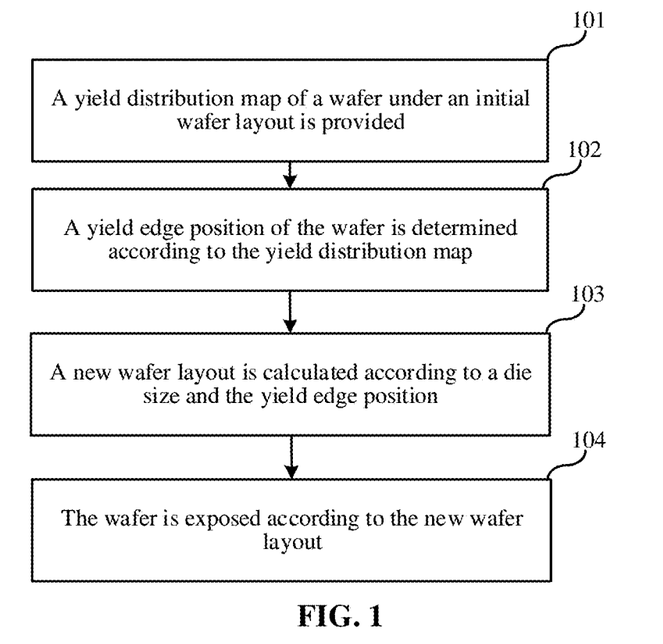
FIG. 1 is a schematic flowchart of a design method of a wafer layout according to a first embodiment of the present application.
Figure 2:
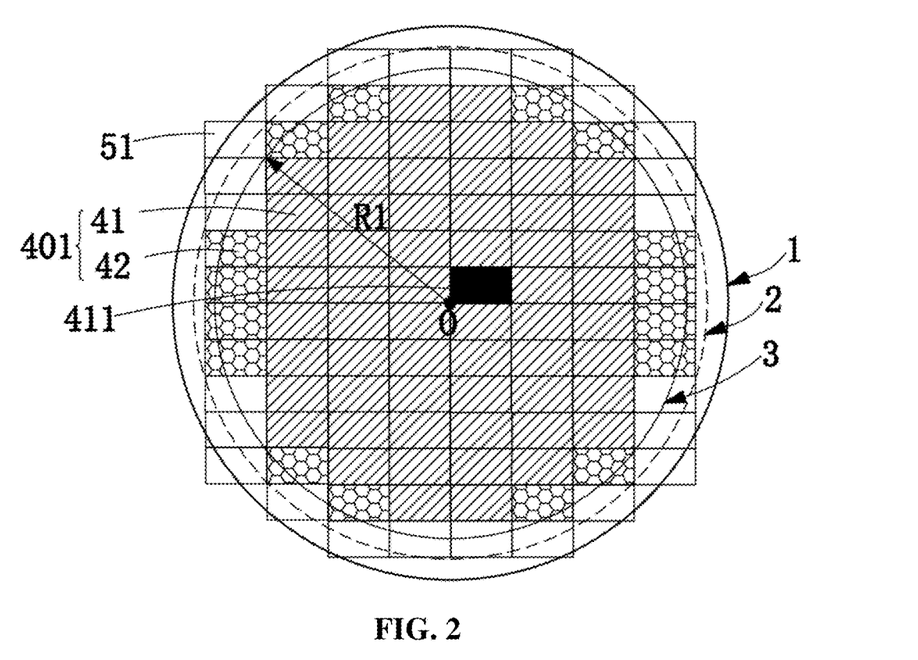
FIG. 2 is a schematic diagram of an initial wafer layout according to a first embodiment of the present application.
Figure 3:
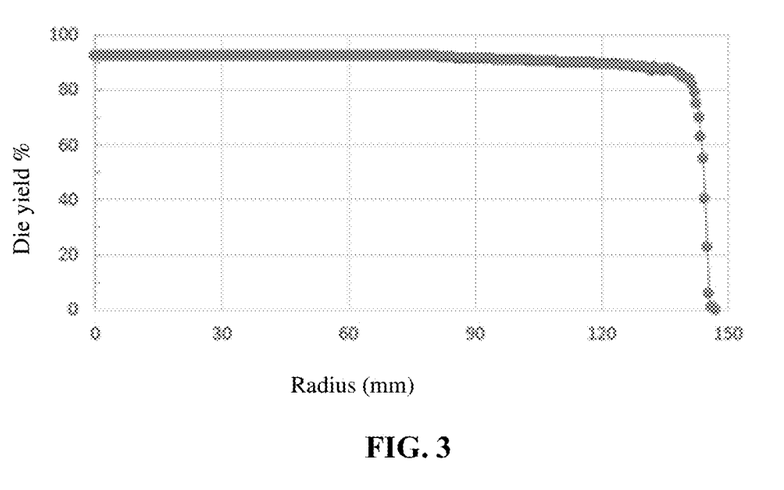
FIG. 3 is a graph illustrating gradual variation of a die yield on a wafer having a radius of 150 mm with the radius according to a first embodiment of the present application.

The schematic flowchart of the design method of a wafer layout in the present embodiment is shown in FIG. 1, and the following detailed description is given with reference to FIGS. 2 and 3. The design method of a wafer layout aims at obtaining a large number of qualified dies during the production of a wafer layout.

In step 101, a yield distribution map 401 of a wafer under an initial wafer layout 51 is provided.

In the present embodiment, the step of providing a yield distribution map 401 of a wafer under an initial wafer layout 51 includes the following operations. The initial wafer layout 51 is determined according to a wafer edge cleaning position 2 and a die size. The wafer is exposed according to the initial wafer layout 51. The exposed wafer is detected to obtain the yield distribution map 401 under the initial wafer layout 51.

In some embodiments, before the wafer is exposed to form dies, photoresist needs to be spin-coated on the surface of the wafer. In the process of spin-coating the photoresist, redundant photoresist may be pushed to an edge 1 of the wafer under a centrifugal force, most of the photoresist is thrown away from the wafer, and part of the photoresist remains on the edge 1 of the wafer. Due to the high gas velocity of the edge 1 of the wafer, the remaining photoresist solidifies quickly, and a raised edge is formed. Therefore, after the photoresist is spin-coated, the edge 1 of the wafer is softly baked, and then the photoresist at the edge 1 of the wafer is removed chemically or optically, which is called photoresist edge repair, or photoresist edge removal. The wafer edge cleaning position 2 is a position obtained after photoresist edge repair is performed on the wafer. In some embodiments, photoresist edge removal may be performed by Edge Bevel Remove (EBR) or Wafer Edge Exposure (WEE).

As shown in FIG. 2, the wafer edge cleaning position 2 is shown by a dashed line and is located on a side of the edge 1 of the wafer close to a center O of the wafer. No complete die can be obtained on a side of the wafer edge cleaning position 2 far away from the center O on the wafer in actual manufacturing. Therefore, when the initial wafer layout 51 is determined, the initial wafer layout 51 is determined according to the wafer edge cleaning position 2 and the die size, the wafer is exposed according to the initial wafer layout 51, and the exposed wafer is detected to obtain the yield distribution map 401 of the wafer under the initial wafer layout 51. The yield distribution map 401 is a position distribution map of qualified dies 41 on the wafer.

In practical applications, when the initial wafer layout 51 is determined according to the wafer edge cleaning position 2 and the die size, the size of a cutting channel and the layout of dies in a single shot are also acquired, so that the initial wafer layout 51 is calculated according to the size of the cutting channel, the layout of dies in the single shot, the die size, and the wafer edge cleaning position 2. The size of the cutting channel is an interval distance between two adjacent dies on the wafer, the shot is a region shot by one exposure when the wafer is exposed, and the shot may also be understood as a region on the wafer corresponding to a single exposure region of a photomask. That is, when the initial wafer layout 51 is determined, the initial wafer layout is determined jointly according to the size of the cutting channel, the layout of dies in the single shot, the die size, and the wafer edge cleaning position 2.

In step 102, a yield edge position 3 of the wafer is determined according to the yield distribution map 401.

In some embodiments, after the yield distribution map 401 of the wafer under the initial wafer layout 51 is obtained, the yield distribution map 401 is detected to determine the yield edge position 3 of the wafer. The distribution of qualified dies 41 and unqualified dies 42 on the wafer can be seen from the yield distribution map 401. FIG. 3 shows a graph illustrating gradual variation of a die yield (die yield=number of qualified dies 41/total number of dies*100%) on a wafer having a radius of 150 mm with the radius is gradually changed. A specific change trend is shown in Table 1 below:

| Radius (mm) | Die yield (%) |
|---|---|
| ~ | ~ |
| 145 | 25 |
| 145.5 | 5 |
| 146 | 1 |
| 146.5 | 0.5 |
| 147 | 0 |
| 147.5 | 0 |
| 148 | 0 |
| 148.5 | 0 |
| 149 | 0 |
| 149.5 | 0 |
| 150 | 0 |

As can be seen from FIG. 3 and Table 1, the die yield in the radial direction of the wafer closer to the center O of the wafer is higher, and the die yield in the radial direction of the wafer closer to the edge 1 of the wafer is lower. Assuming that the distance from the wafer edge cleaning position 2 to the center O is 147.5 mm, it can be seen from the above table that the die yield at the wafer edge cleaning position 2 is 0, but the die yield actually detected is 0 at a position 147 mm from the center O. Therefore, the number of qualified dies 41 obtained after actual production is smaller than the number of complete dies in the initial wafer layout 51. It should be noted that the complete dies in the present embodiment are the complete dies calculated in the initial wafer layout 51. The qualified dies 41 are dies that meet the use requirements after the wafer is exposed according to the initial wafer layout 51. The number of qualified dies 41 is generally not the same as the number of complete qualified dies since, in actual production, the complete dies on the wafer close to the edge 1 of the wafer may be damaged without meeting the use requirements.

In view of the above, the yield edge position 3 is defined in the present embodiment. A die yield at the yield edge position 3 is a preset yield value, which is smaller than a die yield at a side of the yield edge position 3 close to the center O of the wafer and is larger than or equal to a die yield at a side of the yield edge position 3 far away from the center O. Assuming that the preset yield value is 30%, that is, if there are 100 dies at the yield edge position 3, 30 dies are qualified dies 41, and the remaining 70 dies are unqualified dies 42. The die yield at the side of the yield edge position 3 close to the center O of the wafer is larger than 30%, and the die yield at the side of the yield edge position 3 far away from the center O is smaller than or equal to 30%.

In the present embodiment, the preset yield value is 0, that is, the die yield at the yield edge position 3 on the wafer is 0. For example, the yield edge position 3 is shown in FIG. 2. The preset yield value may also be 20%, 30%, or 50%, although it may be automatically set according to actual requirements. The preset yield value at the yield edge position 3 may be set to 50%. At this moment, the dies at a low die yield position where the yield edge position 3 is far away from the center are not considered, so that qualified dies which are closely arranged are easily obtained in the new wafer layout calculated according to the die size and the yield edge position 3. If only the total number of qualified dies 41 is considered and the arrangement position of the qualified dies 41 is not considered, the preset yield value of the yield edge position 3 may be set to 0, so that the total number of qualified dies obtained in the new wafer layout calculated according to the die size and the yield edge position 3 is maximum.

In an embodiment, the yield edge position 3 is a closed line surrounding the center O, and the closed line is a closed curve or a closed broken line. In an embodiment, the closed curve and the edge 1 line of the wafer are concentric, which is convenient for determination of the yield edge position 3 on the wafer.

It should be noted that the step of determining the yield edge position 3 of the wafer according to the yield distribution map 401 includes the following operations. A distance between the center O of the wafer and the qualified die 41 farthest away from the center O is determined as a first size. A closed graph is obtained by taking the center O of the wafer as an origin and the first size as a radius. The location of the closed graph is taken as the yield edge position 3.

In some embodiments, description is made with an example in which the yield edge position 3 is a closed curve which is concentric with the edge 1 line of the wafer, and the die yield of the yield edge position 3 is 0. A qualified die 41 farthest away from the center O of the wafer is determined in the yield distribution map 401. A distance between the center O of the wafer and the qualified die 41 farthest away from the center O is determined as a first size R1. A closed graph which is concentric with the edge 1 of the wafer is obtained by taking the center O of the wafer as an origin and the first size R1 as a radius. A location of the closed graph is taken as the yield edge position 3.

In step 103, a new wafer layout is calculated according to a die size and the yield edge position 3. In some embodiments, the new wafer layout is calculated according to the size of a cutting channel, the layout of dies in a single shot, the die size, and the yield edge position 3.

In step 104, the wafer is exposed according to the new wafer layout.

In some embodiments with respect to steps 103 and 104, in the present embodiment, a damage condition of the dies close to the wafer edge cleaning position 2 in the production process is considered when a new wafer layout is determined, the new wafer layout is determined according to the actual yield edge position 3 and the die size, and the number of obtained qualified dies 41 is approximately the same as the number of complete dies in the new wafer layout after the wafer is exposed according to the new wafer layout, thereby improving the production yield of qualified dies 41 on the wafer.

It should be noted that after a new wafer layout is calculated according to the die size and the yield edge position 3, the method further includes the following steps. A new yield edge position needs to be redetermined and a corrected new wafer layout is recalculated according to the new yield edge position when the yield distribution map of the wafer under the new wafer layout is changed. Therefore, the wafer layout is corrected in time according to the changed yield distribution map of the wafer, and the production yield of qualified dies 41 on the wafer is further ensured.

The embodiments of the present application provide a design method of a wafer layout. The initial wafer layout 51 (i.e. a wafer layout in the related art) is determined according to the die size and the wafer edge cleaning position 2, but the yield of dies close to the wafer edge cleaning position 2 is low or even zero due to the difference of a process control capability in the production process. Therefore, after the wafer is exposed according to the initial wafer layout 51 in the related art, the number of obtained qualified dies 41 is often smaller than the number of complete dies in the initial wafer layout 51. In the present embodiment, the actual yield edge position 3 of the wafer is determined according to the yield distribution map 401 of the wafer under the initial wafer layout 51, a damage condition of the dies close to the wafer edge cleaning position 2 in the production process is considered when a new wafer layout is determined, the new wafer layout is determined according to the actual yield edge position 3 and the die size, and the number of obtained qualified dies 41 is approximately the same as the number of complete dies in the new wafer layout after the wafer is exposed according to the new wafer layout, thereby improving the production yield of qualified dies 41 on the wafer.

A second embodiment of the present application relates to a design method of a wafer layout. The second embodiment is an improvement over the first embodiment. The main improvement is that the present embodiment provides an implementation that specifies how to determine a new wafer layout.

Figure 4:
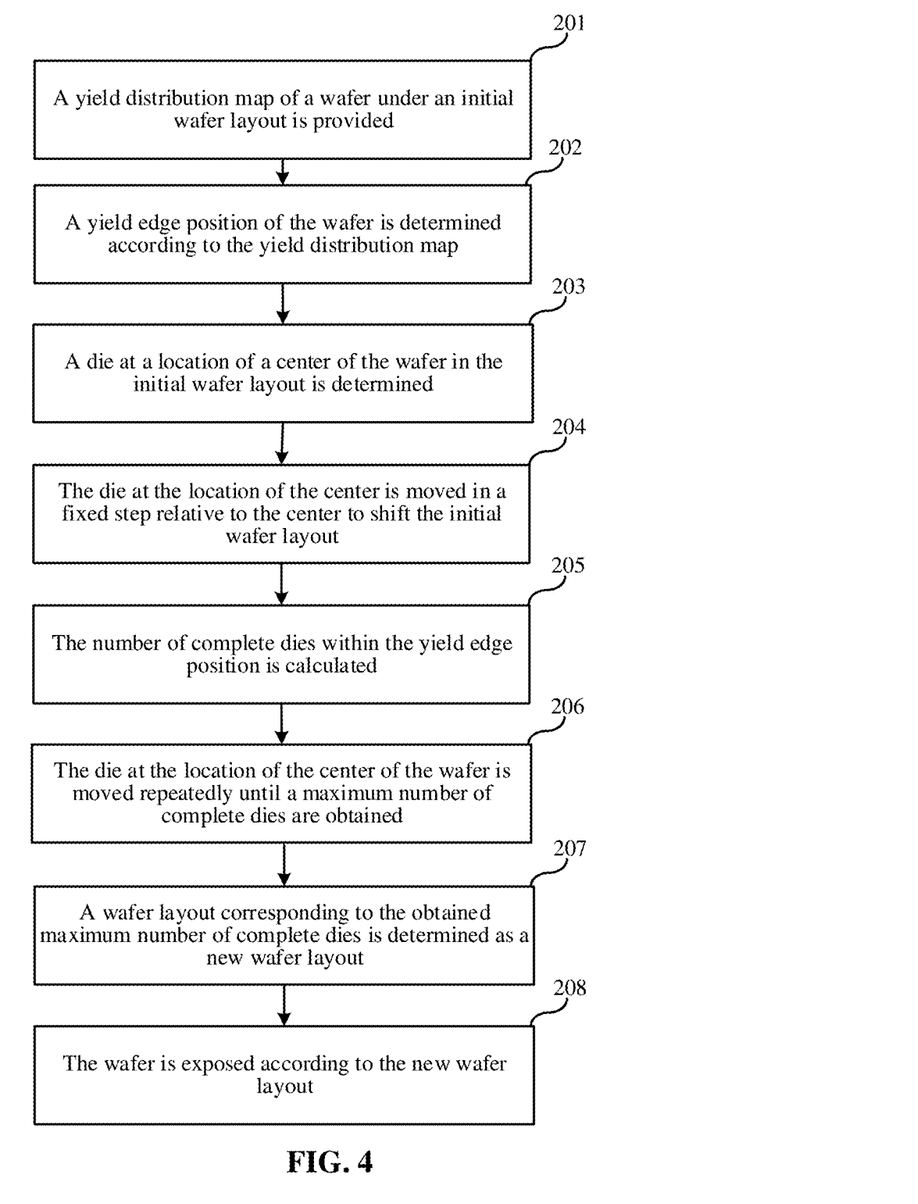
FIG. 4 is a schematic flowchart of a design method of a wafer layout according to a second embodiment of the present application.
Figure 5:
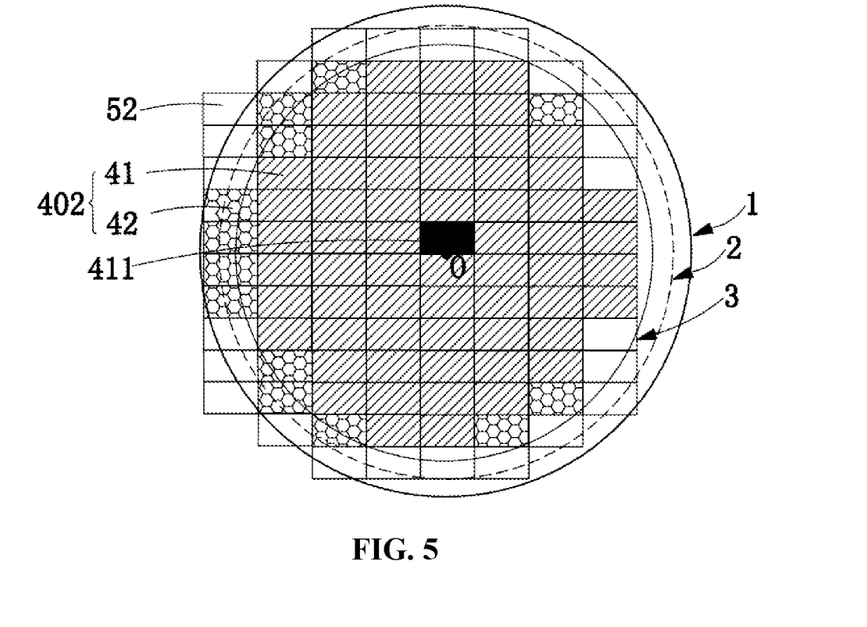
FIG. 5 is a schematic diagram of a new wafer layout according to a second embodiment of the present application.

The schematic flowchart of the design method of a wafer layout in the present embodiment is shown in FIG. 4, and the following detailed description is given with reference to FIGS. 2 and 5.

In step 201, a yield distribution map 401 of a wafer under an initial wafer layout 51 is provided.

In step 202, a yield edge position 3 of the wafer is determined according to the yield distribution map 401.

Steps 201 and 202 are substantially the same as steps 101 and 102 in the first embodiment. Descriptions thereof are omitted in the present embodiment to avoid repetition.

In step 203, a die 411 at a location of a center O of the wafer in the initial wafer layout 51 is determined.

In some embodiments, when the initial wafer layout 51 is determined, a center point of the die 411 at the location of the center O of the wafer may be made to coincide with the center O of the wafer, or, any vertex of the die 411 at the location of the center O of the wafer may be made to coincide with the center O. The initial wafer layout 51 in the present embodiment is shown in FIG. 2, and is illustrated by an example in which any vertex of the die 411 at the location of the center O of the wafer coincides with the center O. Certainly, in practical applications, any point on the die 411 at the location of the center O of the wafer in the initial wafer layout 51 may coincide with the center O.

In step 204, the die 411 at the location of the center O is moved in a fixed step relative to the center O so that the initial wafer layout 51 shifts.

In some embodiments, the die 411 at the location of the center O is moved in a fixed step relative to the center O of the wafer, so that the initial wafer layout 51 shifts, and the die layout on the entire wafer is changed. The die has a transverse edge and a longitudinal edge, the transverse edge has a transverse size, the longitudinal edge has a longitudinal size, the transverse fixed step does not exceed half of the transverse size, and the longitudinal fixed step does not exceed half of the longitudinal size. That is, when the die 411 at the location of the center O is moved relative to the center O, the die may be moved along the transverse direction in a fixed step which is less than half of the transverse size of the die; or, the die may be moved along the longitudinal direction in a fixed step which is less than half of the longitudinal size of the die. Certainly, in practical applications, it is also possible to set a movement direction and a movement step distance automatically. For example, both the transverse fixed step and the longitudinal fixed step are smaller than 1 mm.

In step 205, the number of complete dies within the yield edge position 3 is calculated.

In step 206, the die 411 at the location of the center O of the wafer is repeatedly moved until a maximum number of complete dies are obtained.

In some embodiments with respect to steps 205 and 206, a shifted wafer layout is obtained after each movement of the initial wafer layout 51, and a test wafer (the test wafer has the same size as the wafer in the present application) is exposed with the shifted wafer layout so as to obtain a new yield distribution map 402 under the shifted wafer layout. The number of complete dies of the shifted wafer layout within the yield edge position 3 in the new yield distribution map 402 is calculated. Steps 204 and 205 are repeatedly executed until the calculated number of complete dies within the yield edge position 3 is maximum.

In step 207, a wafer layout corresponding to the obtained maximum number of complete dies within the yield edge position 3 is determined as a new wafer layout 52.

In step 208, the wafer is exposed according to the new wafer layout 52.

In some embodiments with respect to steps 207 and 208, the wafer layout corresponding to the maximum number of complete dies within the yield edge position 3 obtained in the above steps is determined as the new wafer layout 52, so that a maximum number of qualified dies 41 are obtained after the wafer is exposed by using the new wafer layout 52.

In the present embodiment, the step of exposing the wafer according to the new wafer layout 52 includes the following operations. An initial exposure position of the die 411 at the location of the center O of the wafer in the new wafer layout 52 is determined. The wafer is exposed sequentially with a single shot according to the layout of dies in the single shot with reference to the initial exposure position.

The embodiments of the present application provide a design method of a wafer layout. A specific implementation of calculating the new wafer layout 52 according to the die size and the yield edge position 3 is provided.

The above division of various method steps is merely for clarity of description. During implementation, the steps may be combined into one step or some steps may be split and decomposed into a plurality of steps, which may be within the scope of protection of this patent as long as the same logical relationship is included. It is within the scope of protection of this patent to add insignificant modifications to the algorithm or the process or to introduce insignificant designs without changing the core design of the algorithm and the process.

The present embodiment may be implemented in conjunction with the first embodiment. The related technical details mentioned in the first embodiment are still valid in the present embodiment. The related technical details mentioned in the present embodiment may also be applied to the first embodiment. The technical effects that can be achieved in the first embodiment may also be achieved in the present embodiment. Descriptions thereof are omitted here to reduce repetition.

Figure 6:
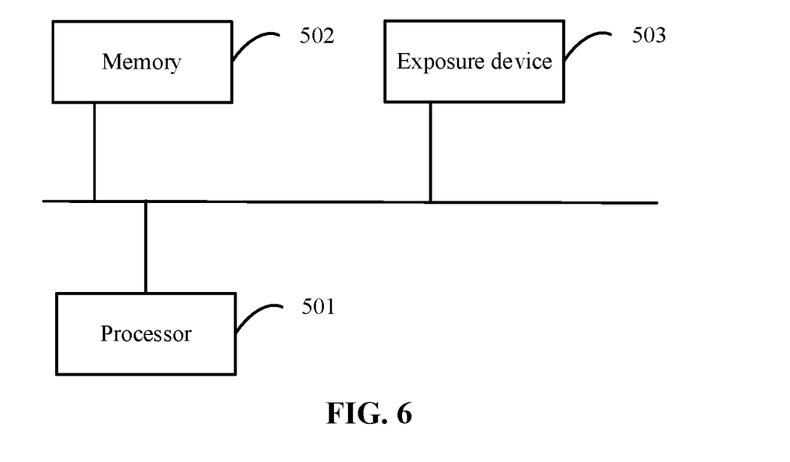
FIG. 6 is a schematic structure diagram of an exposure system of a lithography machine according to a third embodiment of the present application.

A third embodiment of the present application relates to an exposure system of a lithography machine. As shown in FIG. 6, the system includes: at least one processor 501; and a memory 502 and an exposure device 503 communicatively connected to the at least one processor 501. The memory 502 stores instructions executable by the at least one processor 501, and the instructions are executed by the at least one processor 501 to enable the at least one processor 501 to execute the design method of a wafer layout in any of the embodiments described above to obtain a new wafer layout 52. The processor 501 is configured to send the obtained new wafer layout 52 to the exposure device 503, and the exposure device 503 is configured to expose a wafer according to the new wafer layout 52.

The memory 502 and the processor 501 are connected via a bus, which may include any number of interconnected buses and bridges. The bus connects various circuits of the one or more processors 501 and the memory 502 together. The bus may also connect various other circuits, such as peripheral devices, voltage regulators, and power management circuits, which are well known in the art and, therefore, will not be described further herein. A bus interface provides an interface between the bus and a transceiver. The transceiver may be one or more elements, such as a plurality of receivers and transmitters, which provide a unit for communicating with various other devices over a transmission medium. Data processed by the processor 501 is transmitted over a wireless medium via an antenna, which further receives the data and transmits the data to the processor 501.

The processor 501 is responsible for managing the bus and general processing and may also provide various functions including timing, peripheral interfaces, voltage regulation, power management, and other control functions. The memory 502 may be configured to store data used by the processor 501 when performing operations.

A fourth embodiment of the present application also provides a computer-readable storage medium storing a computer program that, when executed by a processor, implements the design method of a wafer layout in any of the embodiments described above.

That is, those skilled in the art will appreciate that all or part of the steps in implementing the methods of the above embodiments may be performed by instructing related hardware via a program that is stored in a storage medium and includes a plurality of instructions for causing a device (which may be a single-chip microcomputer, a chip, etc.) or a processor to perform all or part of the steps of the methods of various embodiments of the present application. The aforementioned storage medium includes: a U-disk, a removable hard disk, a Read-Only Memory (ROM), a Random Access Memory (RAM), a magnetic disk, an optical disk, or other media which may store program code.

It will be appreciated by those of ordinary skill in the art that the various embodiments described above are specific embodiments for implementing the present application and that various changes in form and details may be made in practice without departing from the spirit and scope of the present application.

What is claimed is:

1. A design method of a wafer layout, comprising:
providing a yield distribution map of a wafer under an initial wafer layout;
determining a yield edge position of the wafer according to the yield distribution map; and
calculating a new wafer layout according to a die size and the yield edge position;
wherein the determining a yield edge position of the wafer according to the yield distribution map comprises:
determining a distance between a center of the wafer and a qualified die farthest away from the center as a first size; and
obtaining a closed graph by taking the center of the wafer as an origin and the first size as a radius, and taking a location of the closed graph as the yield edge position.

2. The design method of claim 1, wherein a die yield at the yield edge position is a preset yield value, the preset yield value is smaller than a die yield at a side of the yield edge position close to the center of the wafer and is larger than or equal to a die yield at a side of the yield edge position far away from the center.

3. The design method of claim 2, wherein the preset yield value is 0.

4. The design method of claim 2, wherein the yield edge position is a closed line surrounding the center, and the closed line is a closed curve or a closed broken line.

5. The design method of claim 4, wherein the closed curve and an edge line of the wafer are concentric.

6. The design method of claim 1, wherein the calculating a new wafer layout according to a die size and the yield edge position comprises:
determining a die at a location of the center of the wafer in the initial wafer layout;
moving the die at the location of the center in a fixed step relative to the center to shift the initial wafer layout, wherein the fixed step comprises a transverse fixed step and a longitudinal fixed step, the transverse fixed step is along a transverse direction, and the longitudinal fixed step is along a longitudinal direction;
calculating a number of complete dies within the yield edge position;
repeatedly moving the die at the location of the center of the wafer until a maximum number of complete dies are obtained; and
determining a wafer layout corresponding to the obtained maximum number of complete dies as the new wafer layout.

7. The design method of claim 6, wherein the die has a transverse edge and a longitudinal edge, the transverse edge has a transverse size, the longitudinal edge has a longitudinal size, the transverse fixed step is less than or equal to half of the transverse size, and the longitudinal fixed step is less than or equal to half of the longitudinal size.

8. The design method of claim 6, wherein
a center point of the die at the location of the center of the wafer in the initial wafer layout coincides with the center;
or,
any vertex of the die at the location of the center of the wafer in the initial wafer layout coincides with the center.

9. The design method of claim 1, wherein the providing a yield distribution map of a wafer under an initial wafer layout comprises:
determining the initial wafer layout according to a wafer edge cleaning position and the die size;
exposing the wafer according to the initial wafer layout; and
detecting the exposed wafer to obtain the yield distribution map under the initial wafer layout.

10. The design method of claim 9, wherein the determining the initial wafer layout according to a wafer edge cleaning position and the die size comprises:
calculating the initial wafer layout according to a size of a cutting channel, a layout of dies in a single shot, the die size, and the wafer edge cleaning position.

11. The design method of claim 1, after the calculating a new wafer layout according to a die size and the yield edge position, further comprising:
exposing the wafer according to the new wafer layout.

12. The design method of claim 1, wherein the calculating a new wafer layout according to a die size and the yield edge position comprises:
calculating the new wafer layout according to a size of a cutting channel, a layout of dies in a single shot, the die size, and the yield edge position.

13. The design method of claim 1, after the calculating a new wafer layout according to a die size and the yield edge position, further comprising:
in a case where the yield distribution map of the wafer is changed under the new wafer layout, redetermining a new yield edge position, and recalculating a corrected new wafer layout according to the new yield edge position.

14. An exposure system of a lithography machine, comprising:
at least one processor; and
a memory and an exposure device communicatively connected to the at least one processor, wherein
the memory stores instructions executable by the at least one processor, the instructions being executed by the at least one processor to cause the at least one processor to execute a design method of a wafer layout to obtain a new wafer layout; and
the processor is configured to send the obtained new wafer layout to the exposure device, and the exposure device is configured to expose a wafer according to the new wafer layout,
wherein the design method comprises:
providing a yield distribution map of a wafer under an initial wafer layout;
determining a yield edge position of the wafer according to the yield distribution map; and
calculating the new wafer layout according to a die size and the yield edge position;
wherein the determining a yield edge position of the wafer according to the yield distribution map comprises:
determining a distance between a center of the wafer and a qualified die farthest away from the center as a first size; and
obtaining a closed graph by taking the center of the wafer as an origin and the first size as a radius, and taking a location of the closed graph as the yield edge position.

15. The exposure system of claim 14, wherein a die yield at the yield edge position is a preset yield value, the preset yield value is smaller than a die yield at a side of the yield edge position close to the center of the wafer and is larger than or equal to a die yield at a side of the yield edge position far away from the center.

16. The exposure system of claim 15, wherein the preset yield value is 0.

17. The exposure system of claim 15, wherein the yield edge position is a closed line surrounding the center, and the closed line is a closed curve or a closed broken line.

18. The exposure system of claim 17, wherein the closed curve and an edge line of the wafer are concentric.

19. A nonvolatile computer-readable storage medium, storing instructions executable by a processor, wherein when executed by the processor, the instructions causes the processor to:
- provide a yield distribution map of a wafer under an initial wafer layout;
- determine a yield edge position of the wafer according to the yield distribution map; and
- calculate a new wafer layout according to a die size and the yield edge position;
- wherein in the calculation of the new wafer layout according to the die size and the yield edge position, the instructions causes the processor to:
  - determine a distance between a center of the wafer and a qualified die farthest away from the center as a first size; and
  - obtain a closed graph by taking the center of the wafer as an origin and the first size as a radius, and take a location of the closed graph as the yield edge position.

* * * * *